Patented Aug. 27, 1946

2,406,671

UNITED STATES PATENT OFFICE 2,406,671

CUTTING OIL

Hyman Diamond, Berkeley, Calif., assignor to Shell Development Company, San Francisco, Calif., a corporation of Delaware No Drawing. Application September 25, 1944, Serial No. 555,755

7 Claims. (Cl. 252—49.6)

This invention relates to a method for reducing foam in oil-in-water emulsions, to the herein described foam-reducing compounds, and to oleaginous compositions containing such foam-reducing additives. In one of its specific embodiments, the invention is exemplified by soluble cutting oils, that is, cutting oils which contain emulsifying agents and which spontaneously emulsify when diluted with water, which oils are improved by small foam-inhibiting amounts of the herein described saturated alkyl silicon oxides or esters.

In the U. S. patent application, Serial No. 483,220, of Robert G. Larsen and Hyman Diamond, filed April 15, 1943, issued May 1, 1945, as U. S. Patent No. 2,375,007, of which this is a continuation-in-part, it was disclosed that minute amounts of certain polymeric silicon oxides or esters (that is, silicones and silicates) produce the extraordinary effect of reducing or eliminating the foaming of organic compositions. Such polymers are preferably low-molecular-weight saturated dialkyl silicones, a particularly effective example of which is polymeric dimethyl silicone. Thus, in amounts as low as 0.0001% W. such silicon polymers will decrease the dangerous foaming of high-viscosity aviation lubricating oils.

No explanation of how these silicon polymers exert this effect is known. However, it has been found that the polymers of such low-molecular-weight silicones do not exert such an effect in oil-in-water emulsions. But higher-molecular-weight saturated alkyl silicones and silicates, on the other hand, do show such foam-decreasing effects in oil-in-water emulsions.

Contrarily, these higher-molecular-weight silicon compounds are without appreciable foam-reducing effect in single phase organic compositions or in water-in-oil emulsions in which the lower-molecular-weight members are effective.

Silicones have the basic formula

wherein the two R's are the same or different organic radicals. Polymerization, which appears more evident among the lower-molecular-weight silicones such as dimethyl silicone, takes place through oxygen-silicon linkages.

The silicones of the present invention are those having a total minimum of about 24 and preferably 28 saturated alkyl carbon atoms in the two R groups. It is thus seen that each R is either a straight chain or cyclic aliphatic radical. These radicals may also contain such substituents as esterified sulfonic, alkoxy, nitro, halogen, etc., radicals which do not interfere with the beneficial employment of the compounds.

For the present purpose those silicones in which the two R's are of about the same molecular weight are preferred and particularly those in which each R is a saturated alkyl radical containing about 14 to 24 carbon atoms. Illustrative examples are tetra decyl, pentadecyl, hexadecyl, heptadecyl, octadecyl, nonadecyl, eicosyl, heneicosyl, docosyl, tricosyl, tetracosyl, and the like.

As indicated above, each R may consist in whole or part of cycloaliphatic radicals. Such radicals, for example, may be derived from alicyclic alcohols found in the mixture of by-products formed in the commercial production of isophorone

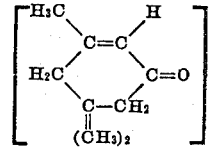

by the reaction of acetone with strong aqueous caustic solutions. This reaction, carried out at elevated temperatures and pressures, produces, in addition to isophorone, a mixture of higher boiling ketones known as isophorone bottoms. This mixture may be readily hydrogenated, at elevated temperatures and pressures, with hydrogen in the presence of a suitable catalyst such as nickel. The resulting saturated product is a mixture of cyclic, secondary alcohols having from 9 to 18 carbon atoms and predominating in 12- to 15-carbon alcohols. They are characterized by ready oil solubility and impart desirable properties to compounded lubricating oil. The mixture of alcohols having the necessary number of carbon atoms or suitable fractions of such mixtures may be used, or individual components may first be separated and the particular silicon compounds prepared therefrom. Representative components of the mixture are 3,3,5-trimethylcyclohexanol
2-isopropyl-3,3,5-trimethylcyclohexanol
6-isopropyl-3,3,5-trimethylcyclohexanol
4-isopropyl-3,3,5-trimethylcyclohexanol
3,5-dimethyl-3-isobutylcyclohexanol
3,3-dimethyl-5-isobutylcyclohexanol
1,1,3,6,6-pentamethyl-8-hydroxydecalin
3,6,8,8,10-pentamethyl-1-hydroxydecalin Others of these alcohols are bicyclic and possibly tricyclic. It is to be understood however that cycloparaffinic silicones and silicates are not limited to those derived from isophorone bottoms but cycloaliphatic alcohols having the necessary number of carbon atoms may be derived from any suitable source.

Silicones may be prepared by hydrolyzing an alkyl silicon halide, such as the chloride, bromide, or iodide, and (partially or completely) dehydrating the resulting hydroxy product. The alkyl silicon chlorides are preferred starting compounds.

For example, dicetyl silicone was prepared as follows: A solution of 158 g. (0.507 mol) of cetyl bromide in ether was added to 12.3 g. (0.507 mol) of magnesium turnings covered by ether containing a trace of iodine, and the mixture was refluxed. The resulting cetyl magnesium bromide solution was added to an ethereal solution of 42 g. (0.247 mol) of silicon tetrachloride. The Grignard addition product precipitated out at room temperature but was soluble in ether at 30–35°. It was hydrolyzed with cold, dilute sulfuric acid and the ether layer evaporated to yield 127 g. of a mixture of cetyl siliconic acid ($C_{16}H_{33}SiOOH$) and dicetyl silicone. The latter was separated by solution in hot (80° C.) methyl ethyl ketone from which it precipitated on cooling. The yield was 93 g. of dicetyl silicone melting at 57–59° C. A second recrystallization from the same solvent yielded 74 g. of dicetyl silicone melting at 60–61° C. The highest melting point obtained by further purification was 63°–65° C.

The meta silicates may be prepared by reacting the desired alcohol, mercaptan, selenol or tellurol (or mixtures thereof) with silicon tetrachloride and water in the proportions $$2RXH + SiCl_4 + H_2O \rightarrow (RX)_2SiO + 4HCl \uparrow$$

The ingredients may be maintained anywhere from room temperature up to about 350° C. or more when refluxing or otherwise up to about the boiling temperature of the alcohol or analogous compound until the reaction is substantially complete; the dialkyl silicate is then distilled off by raising the temperature of the mixture to the boiling point of the desired product. Diethyl silicate boils at 360° C., its homologs correspondingly higher. The reaction may be effected either without a diluent or with an inert solvent for the reactants such as water, dioxane, etc. Reaction time is on the order of a few hours to a day.

The ortho silicates may be obtained by ester exchange reaction with tetra ethyl ortho silicate [$(C_2H_5O)_4Si$], a commercial product. Tetra methyl ortho silicate may likewise be used; such compounds can be obtained by reaction of $SiCl_4$ with anhydrous alcohol. The ester exchange reaction is effected by heating the desired alcohol, mercaptan, selenol or tellurol (or mixtures thereof) with the ortho silicate. The synthesis is conveniently effected in the presence of anhydrous acid or basic catalyst such as benzene sulfonic acid, para-toluene-sulfonic acid, sodium ethoxide, etc. A suitable temperature range is from the boiling point of ethyl alcohol (which is driven off from the ortho silicate) up to about 200° C., a preferred range being about 100° to 150° C. If desired, sufficient toluene or other solvent may be added so as to form an azeotrope with the ethyl alcohol produced. Reaction time is 2 to 3 hours or more depending on the efficiency of the ethyl alcohol removal.

Association or polymerization of the silicon oxides and esters may be promoted, if desired, by heating in the presence of oxygen with an acidic agent such as HCl, $H_2SO_4$, $H_3PO_4$, HF, $BF_3$, $Br_2$, etc. For example, the degree of polymerization and foam-inhibiting property of dimethyl silicone was very considerably increased by refluxing it with a few drops of concentrated hydrochloric acid at 120°–138° C. for about 16 hours. For compounds of greater monomeric molecular weight a temperature in the range of about 175°–250° C. is usually applicable for a period ranging from a few hours to several days. The ortho silicates can be polymerized by simply distilling them in the presence of water. The term "associated compound" as used herein and in the appended claims is taken to include both the highly polymerized and the loosely associated compounds.

The dicetyl silicone was fusible and soluble in hot methyl ethyl ketone, ethyl alcohol and hydrocarbons. It contained less than 0.02% of remaining halogen.

| Analysis | Found | Calculated |
|---|---|---|
|  | Per cent by weight | Per cent by weight |
| Si (micro) | 8.0 | 5.7 |
| C | 75.6 | 77.8 |
| H | 13.1 | 13.3 |
| O (by difference) | 3.3 | 3.2 |

An ebullioscopic determination of the molecular weight in methyl ethyl ketone solution indicated a molecular weight of approximately 1500 indicating that the dicetyl silicone was associated or polymerized to the extent of three monomeric units.

Silicones in which the two R's have different values are made by adding mixtures of two or more organo-magnesium bromides (for example, dodecyl magnesium bromide, eicosyl magnesium bromide, etc.) to the silicon tetrachloride and hydrolyzing the product as in the foregoing example.

The other classes of silicon compounds which may be employed analogous to the above described silicones are the corresponding meta silicates

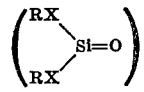

and the corresponding ortho silicates

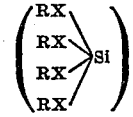

X represents oxygen, sulfur, selenium or tellurium. The several R's in these formulae have the same values as the R's in the earlier silicone formula; the silicates and ortho silicates should likewise contain a minimum total of 24 to 28 carbon atoms per monomeric unit. Those in which each R is an acyclic alkyl radical of at least 14 carbon atoms are preferred.

The use of these silicon oxides and esters in eliminating foam from oil-in-water emulsions may be illustrated by reference to their employment in cutting oils.

Commonly used cutting oils are mineral-oil or petroleum-base compositions containing suitable emulsifying agents. Such compositions ("soluble" cutting oils) should be capable of emulsifying quickly with from, say, 3 to 100 times their volume of water, depending upon the particular use to which the composition is to be put. For turning high-tensile steels, for example, or for tapping and broaching, the oil is emulsified with only a few volumes of water. For surface grinding, on the other hand, it may be emulsified with up to about 100 volumes of water.

A particularly vexing problem in the use of such emulsions is the formation of foam or froth upon agitation. In metal-cutting operations this may result in overheating of the metal and cutting tool, pressure failure of vapor-locking of the delivery pump, loss of emulsion due to overflow from the sump, spreading of the emulsion over adjoining parts, and other difficulties. Indeed, in order to minimize foaming, recourse may be had to low-pressure circulation of the lubricant, even though high-pressure delivery of the cutting oil from narrow-section pipes would otherwise give much more satisfactory performance.

In general, amounts of the present alkyl silicon oxides and esters adequate to suppress foaming in cutting oil-in-water emulsions are about 0.05% to 0.5% by weight, although larger amounts may be employed if desired.

Hitherto, cutting oils have been made with mineral oils having the approximate viscosity of a petroleum white oil—that is a S. U. viscosity of about 100-250 sec. at 100° F.—which base oils generally have comparatively low film strength. These cutting oil formulae have also generally contained extreme pressure additives such as sulfur, phosphorus, halogen compounds, etc., to impart greater film strength. However, such additives are generally corrosive. When attempts were made to eliminate the E. P. components and compensate by increasing the viscosity of the oil, it was found that the frothing tendency of the emulsion was much increased, due, in part, to the higher-viscosity oil and in part to the larger quantity of emulsifying agent necessitated by the higher-viscosity oil. Now, however, by the employment of the present foam-suppressing silicon compounds, one may advantageously employ a much more viscous base such as a mineral oil having a S. U. viscosity at 210° F. of up to say 120 or 150 seconds, or even higher, and no corrosive E. P. agent need be added. Such a composition combines the properties of non-corrosiveness, high film strength, and freedom from foaming.

Such an oil may be employed in practically all of the many utilizations of a soluble cutting oil for hard and soft metals alike, by the simple expedient of diluting it with the necessary amount of water for the particular purpose at hand. However, use of the present foam-reducing silicon compounds is not limited to their employment with mineral-base cutting oils of any particular viscosity. In addition, although cutting oils are preferably made from a mineral-oil or petroleum-base, this may be substituted in whole or part by fatty oils of animal or vegetable origin such as lard, tallow, degras, fish oil, sperm oil, cottonseed oil, soya bean oil, castor oil, cashew nut oil, corn oil, olive oil, rapeseed oil, linseed oil, palm oil, etc., as well as by the so-called "synthetic" lubricants such as are produced, for example, by the polymerization of olefins, esters, ethers, etc.

Such cutting oils may contain any of the known emulsifying agents (individually or in combination) such as voltolized oils or fatty acids, rosin soap, naphthenic soaps, alkali metal or nitrogen base salts of arginic acid or of petroleum (or other organic) sulfonic acids, sulfonated vegetable or animal oils (for example, Turkey red oil, sulfonated-linseed oil, -rapeseed oil, -olive oil, -sperm oil, etc.) and their soaps; fatty acids, their glycerides and their metallic, ammonium and alkylolamine salts; esters or ethers of polyhydric alcohols with sulfonated oils or sulfonated dicarboxylic acid ethers; mono-fatty acid-esters or ethers of tri- or higher poly-ethylene glycol in which the fatty acid radical contains about 10-24 carbon atoms which may be saturated or unsaturated, etc. Suitable quantities of emulsifying agents are generally up to about 35% or even more based on the weight of the oil.

Small quantities of emulsion-stabilizing agents such as diethylene glycol, glycerol, or cyclohexanol may also be present. Other foam-reducing agents may be simultaneously employed, for example, sulfonated fish oils (such as sulfonated shark oils), high-molecular-weight saturated fatty acids (for example, stearic, palmitic or arachidic acids), as well as their salts such as aluminum, magnesium, barium, calcium, zinc, -stearate, -palmitate, -arachidate, etc.

Other ingredients may also be present such as corrosion-preventive agents; viscosity regulators; "extreme pressure" additives or film-strength improvers such as halogen-, sulfur-, or phosphorus-bearing compounds; antioxidants; surface-active agents; bactericides, water-softening agents, etc.

*Example*

A cutting oil was made from about 70% of refined mineral oil of a S. U. viscosity at 210° F. of about 100 to 120 seconds, and about 30% of emulsifying agent consisting principally of potassium salts of rosin acids. When this was emulsified with three or more volumes of water, as little as 0.2% of the earlier described dicetyl silicone caused appreciable decrease in the amount of foaming while 0.3% provided excellent foam suppression.

In place of dicetyl silicone, one may employ distearyl silicone, cetyl-stearyl silicone or the corresponding meta silicates or ortho silicates in the above example also with satisfactory results.

It will be appreciated that the preceding description of the use of high-molecular-weight silicon oxides and esters in cutting oil is given by way of illustration only and that the employment of such silicon compounds to inhibit foaming is not limited to this specific application but that they are broadly applicable to alleviate any occurrence of foam in oil-in-water emulsions wherever they occur. Many instances for such application may be found; for example, they may be used in oil-in-water emulsions occurring in the treatment or processing of petroleum, other oleaginous or water-immiscible substances, in connection with such operations as distillation, fractionation, solvent extraction, evaporation, concentration, filtration, settling, emulsion breaking, condensation, etc.

Foaming in connection with oil-in-water emulsions may also occur in ore flotation, in the production of pulp and paper, in the tanning and dyeing industry, in dry cleaning, in the production or extraction of oils, perfumes, latex, resins, and other organic substances, etc.

In distillation and related operations wherein an oil-in-water emulsion may be present at one stage of the procedure and a water-in-oil or unemulsified oil of water-immiscible layer is present at another stage, it is advantageous to have present both a polymeric low-molecular-weight silicon oxide or ester such as polymerized dimethyl silicone and also one of the herein described higher-molecular-weight saturated alkyl silicon oxides or esters.

For example, in the production of synthetic rubber, liquid butadiene is extracted from a mixture of the butadiene with butylenes and other liquid hydrocarbons by absorption with aqueous copper ammonium acetate. Agitation of the two liquids to form the butadiene-copper complex results in emulsions and foaming which, if not quickly dispersed, will retard the ready separation of the two liquids after agitation has ceased. Accordingly, small amounts of the polymers of both the low and the high molecular weight silicon oxides and esters are added to the mixture, conveniently with the aqueous phase.

Again, in the production of alkyl succinic acids by condensation of olefins with maleic anhydride and subsequent hydrolysis, the dicarboxylic acid (both before and after hydrogenation) is separated from the reaction mixture by distillation usually with steam. This distillation begins in the presence of water and then, after the water has been distilled off, continues under anhydrous conditions. Foaming has also been an annoyance here, causing spattering of the mixture and carry over of less volatile components, thereby causing the operator to hold the distillation temperature lower than would otherwise be necessary. Now, by the addition of a small amount of the present mixture of low and high molecular weight silicon compounds, this problem is greatly ameliorated.

The present compounds also finds application in the regeneration of solutizer solutions used in the treatment of petroleum fractions. For example, in the extraction of mercaptans from gasoline by an aqueous alkaline mixture of sodium phenolates and sodium isobutyrate or other solutizer solutions such as those shown for example in U. S. Patent 2,346,497. The fat solutizer solution is freed of absorbed mercaptans and the like by being blown by either an inert or an oxidizing gas such as air, oxygen, nitrogen, steam, etc. This stripping operation also results in undesirable foaming which may be controlled by addition of small amounts of low and high molecular weight silicones and silicates. This mixture of silicon polymers is likewise applicable to control foam in such petroleum processes as propane dewaxing, deasphalting and deresining, etc.

I claim as my invention:

1. An oleaginous composition capable of forming oil-in-water emulsions, which composition contains a foam-reducing amount of an associated compound selected from the group consisting of

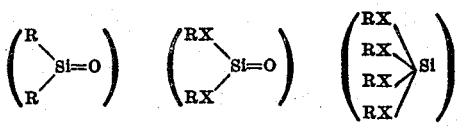

wherein each R is a saturated, non-aromatic organic radical and X is selected from the group consisting of oxygen, sulfur, selenium and tellurium atoms, the total number of carbon atoms in the R's associated with each Si atom being at least 24.

2. The composition of claim 1 wherein each R has a minimum of 14 carbon atoms and X is oxygen.

3. The composition of claim 1 wherein the oleaginous composition is a cutting oil.

4. The composition of claim 1 wherein the foam-reducing compound is dicetyl silicone.

5. The composition of claim 1 wherein the foam-reducing compound is present in about 0.05–0.5% weight based on the amount of the oleaginous component.

6. A method for minimizing the occurrence of foam which occurs in treatment of oil and water mixtures in which oleaginous material is in the form of an oil-in-water emulsion during only part of the treating process, which method comprises having present a foam-reducing amount of a mixture of a saturated dialkyl silicone in which the two alkyl radicals contain a total minimum of at least 24 carbon atoms and a polymer of a low-molecular-weight dialkyl silicone.

7. The method of claim 6 wherein the two silicones are dicetyl silicone and dimethyl silicone respectively.

HYMAN DIAMOND.